Feb. 9, 1943.    J. H. PAYNE    2,310,747
SWITCH TESTING APPARATUS
Filed Nov. 10, 1939    3 Sheets-Sheet 1

Inventor:
John H. Payne,
by Harry E. Dunham
His Attorney.

Feb. 9, 1943.    J. H. PAYNE    2,310,747
SWITCH TESTING APPARATUS
Filed Nov. 10, 1939    3 Sheets-Sheet 2
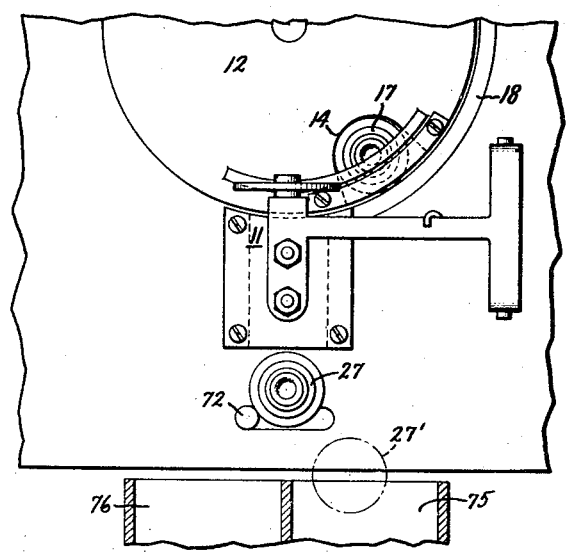
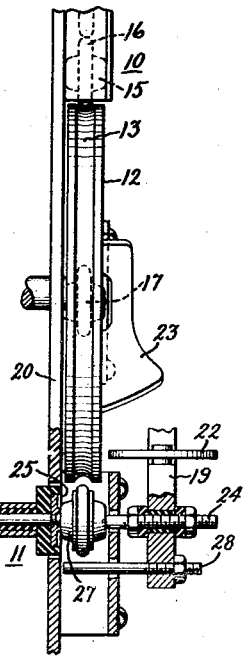
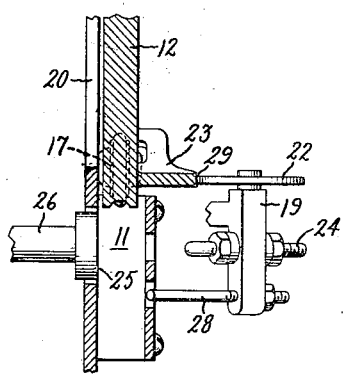
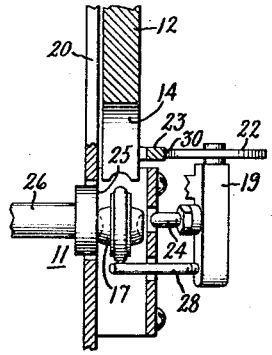
Inventor:
John H. Payne,
by Harry E. Dunham
His Attorney.

Feb. 9, 1943.   J. H. PAYNE   2,310,747
SWITCH TESTING APPARATUS
Filed Nov. 10, 1939   3 Sheets-Sheet 3

Inventor:
John H. Payne,
by Harry E. Dunham
His Attorney.

Patented Feb. 9, 1943

2,310,747

UNITED STATES PATENT OFFICE 2,310,747

SWITCH TESTING APPARATUS

John H. Payne, Ballston Spa., N. Y., assignor to General Electric Company, a corporation of New York Application November 10, 1939, Serial No. 303,847

11 Claims. (Cl. 209—81)

This invention relates to apparatus for testing gas-filled electric switches and the like.

It has been found that the quality, and more particularly the pressure and degree of purity of a gas may be quite accurately measured by observing certain characteristics of a transitory arc produced in the gas. This discovery is described in detail in Patent No. 2,245,168, C. G. Suits, issued June 10, 1941, and assigned to the same assignee as the present application which patent further contains claims on a method and means by which the discovery may be practically utilized in the testing of gaseous atmospheres.

My present invention is an improvement on the invention described and claimed in the aforementioned Suits patent and comprises apparatus for the production-line testing of gas-filled electric switches, such as hydrogen-filled mercury contact switches. An important feature of the invention consists in a novel mechanism for producing a transient arc within a switch under test by operating the switch in a load circuit and for automatically accepting or rejecting the switch upon the basis of a time-dependent characteristic of the resultant arc.

A further feature of the invention consists in the provision of automatic means for conveying switches from a loading station to the testing mechanism and for effectively transferring the switches from the conveying to the testing means.

A still further feature comprises the provision of means for measuring the characteristics of an arc produced within a tested switch at the test station with a high degree of accuracy and in such a way as to minimize the possibility of statistical error.

Figure 1:
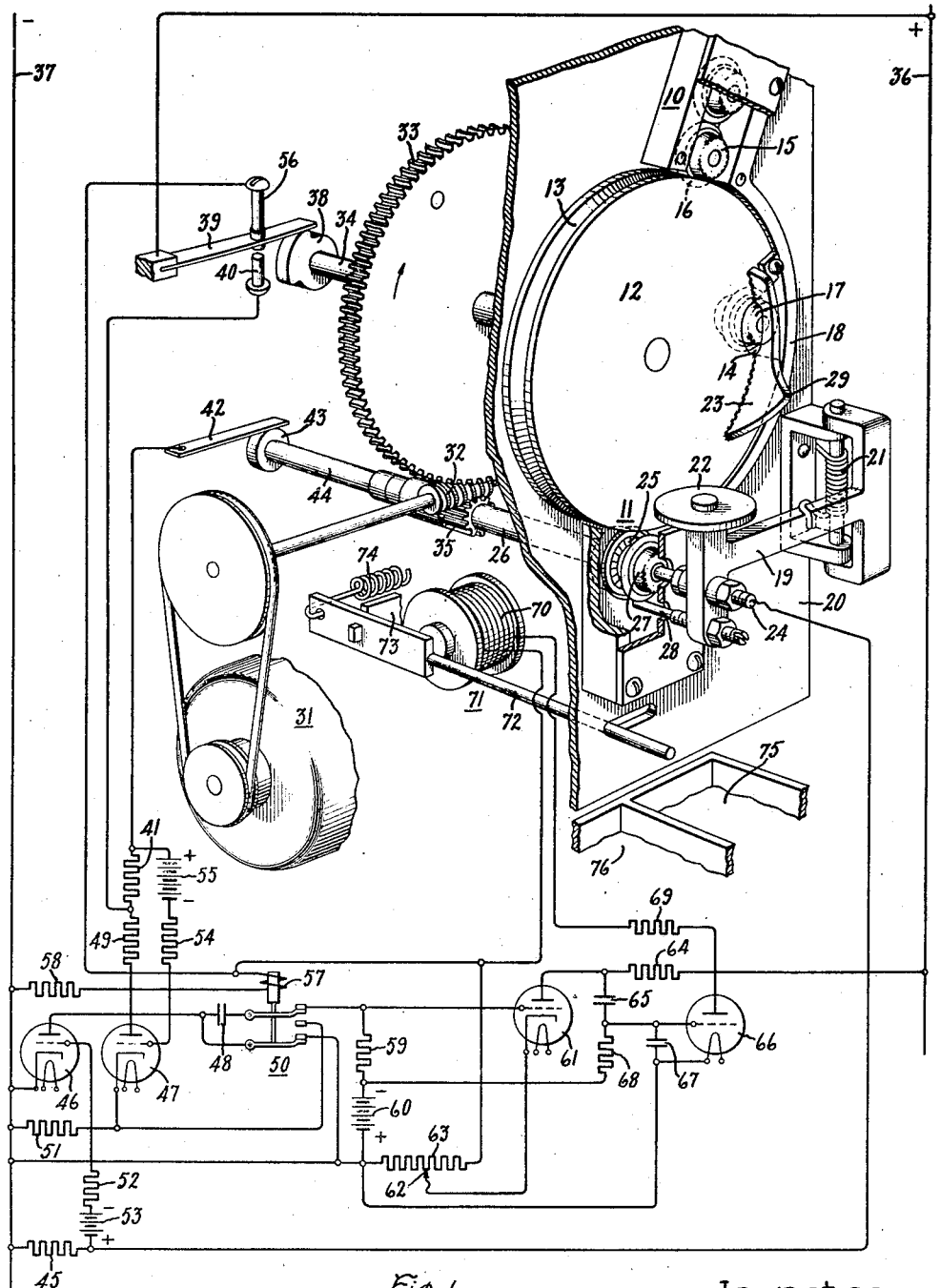
Figure 6:
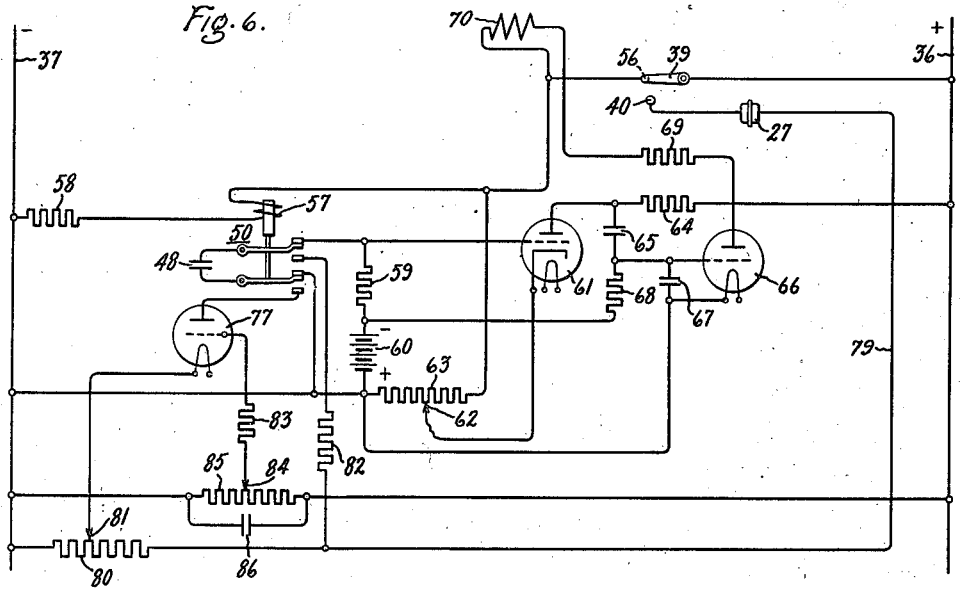
Figure 7:
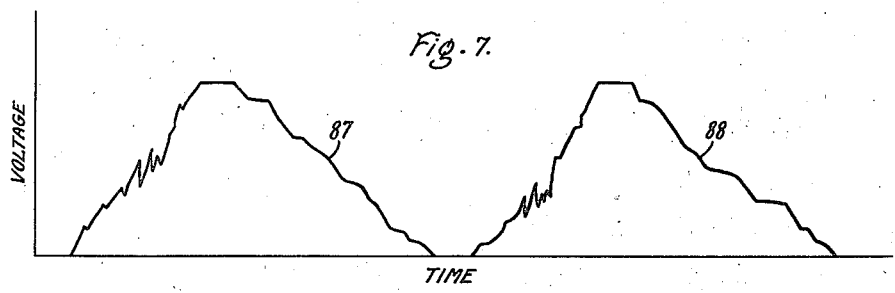

The features of my invention which I believe to be novel are set forth with particularity in the appended claims. My invention itself, however, both as to its organization and method of operation, together with further objects and advantages thereof may best be understood by reference to the following description taken in connection with the accompanying drawings in which Fig. 1 illustrates a circuit and a perspective view, with portions broken away, of apparatus embodying my invention; Fig. 2 illustrates a detailed portion of the apparatus of Fig. 1; Figs. 3, 4, and 5 are side views of certain details of Fig. 1 in different operative positions; Fig. 6 illustrates an alternative circuit for use in connection with the apparatus illustrated in Fig. 1; and Fig. 7 illustrates a characteristic of an electrical arc created in a gas.

Referring to Fig. 1, the apparatus shown includes means for conveying individual switches successively and periodically from a loading position, indicated at 10, to a testing position, indicated at 11, where each switch is placed in circuit with electric measuring means and is operated one or more times between open and closed position. The electric measuring means measures a time-dependent characteristic, such as the duration of the resultant arc or arcs, and thereby determines the acceptance or rejection of the particular switch under test.

The above-mentioned switch conveying means comprises a rotating wheel 12 having a peripheral groove 13 and a radial indentation 14 in its periphery. A switch 15, in the loading position, bears against the periphery of the wheel 12. The switch 15 is roughly cylindrical in shape with a protruding ring 16 about the center of its cylindrical surface. As the switch 15 rests against the wheel 12 the ring 16 remains within the groove 13 and maintains the switch 15 with its axis parallel to the axis of the wheel 12. After the indentation 14 in the conveying wheel 12 has passed beneath the loading position 10, a switch 17, which has fallen from the loading position into the indentation 14 in its passage thereby, is maintained in the indentation 14 by a retaining strip 18 which fits closely adjacent the periphery of the wheel 12 from the loading position 10 to the testing position 11.

A better idea of the manner in which the retaining member 18 maintains the switch 17 in the indentation 14 may be had by reference to Fig. 2, wherein the wheel 12 is shown turned so that the switch 17 is nearing the testing position 11.

The manner in which the ring 16 around the switch 15 cooperates with the groove 13 in the conveying wheel 12 may be better understood by reference to Fig. 3, wherein the switch 17 is shown being conveyed to the testing position 11.

Referring to Fig. 4, the switch 17 is shown in a position just before being carried by the wheel 12 beyond the retaining member 18. The switch testing position 11 is ready to receive the switch 17 since the switch which has just been tested has been allowed to fall from the testing position 11 by mechanism to be described in greater detail hereinafter.

Referring to Figs. 1 and 3, there is shown an arm 19 pivotally mounted upon a base member 20 to which the entire apparatus is related. The arm 19 is biased toward the base 20 by a spring 21. A cam follower wheel 22 is pivotally mounted on the arm 19 so as to cooperate with a cam surface 23 affixed to the wheel 12. An electric contact pin 24 is fixed to the arm 19 and insulated therefrom and extends toward the switch testing position 11. On the other side of the switch testing position 11 from the contact pin 24, there is a rotating, electrically conducting, chuck surface 25 which is turned by a shaft 26, from which it is insulated. The contact pin 24 and the rotating chuck surface 25 are axially disposed with respect to each other so as to hold the switch 27 therebetween. Because of frictional engagement between the surface 25 and the switch 27, the rotation of the chuck surface 25 rotates the switch 27 so that an electrical circuit which includes the switch is repeatedly completed and interrupted. A retaining pin 28 is fixed in the arm 19 below the contact pin 24 and extends under the testing position 11. Referring to Fig. 4, it may be seen that when the switch 17 is nearing a position above the testing position 11 the cam surface 23 has a high portion 29 directly under the follower wheel 22. In this position of the cam surface 23 the arm 19 is biased farthest from the base 20 and the contact pin 24 and retaining pin 28 are completely removed from the testing position 11 so that any switch therein may fall freely away from the testing position.

Referring to Fig. 5, there is illustrated the manner in which the switch 17 is delivered to the testing station 11 to be tested. When the indentation 14 in the wheel 12 is directly above the testing position 11, the switch 17 falls therefrom into the testing position. As the wheel 12 has rotated into this position, a portion 30 of the cam surface 23 which is considerably lower than the high portion 29, allows the arm 19 to be moved nearer the base 20 so that the retaining pin 28 has moved underneath the testing station 11. Therefore when the switch 17 falls into the testing position 11 from the indentation 14, it is kept from falling further by the retaining pin 28. In this position of the parts, the switch 17 is not quite aligned with the contact pin 24 and the surface 25. Upon further rotation of the wheel 12 the cam surface 23 passes out of contact with the follower wheel 22 and the arm 19 is moved toward the base 20 until the contact pin 24 and the chuck surface 25 engage the switch. Such a completed engagement may be best understood by reference to the switch 27 in Fig. 3. In view of the above, it will be seen that the wheels 22 and 12 including the cam surface 23 cooperate to produce an intermittent approaching and regressive movement between the members 24 and 25 and to synchronize the movement of these members with the interposition between the members of the switches to be tested.

To provide proper cooperation between the rotating wheel 12 and the chuck surface 25, a common source of motive power 31 (Fig. 1) is provided which rotates a worm gear 32 at a constant speed. The gear 32 engages both a gear wheel 33, which drives the wheel 12 through a shaft 34, and a small gear 35 mounted on the shaft 26. The relative size of the gears indicated in the drawings is intended to indicate that a switch is rotating six or seven times, or more, while it is maintained in the testing circuit.

This testing circuit is supplied with current from a pair of supply lines 36 and 37 which are connected respectively to the positive and negative terminals of a source of potential, not shown. While a switch is in the testing position 11 a supply switch operated by a cam 38 on the shaft 34 provides that testing current be supplied thereto. The cam 38 during the testing period allows the movable element 39 of the supply switch to remain in contact with a fixed element 40 thereof. The movable element 39 is connected to the wire 36 and the fixed element 40 supplies current through a resistor 41 to a contact spring 42. The spring 42 makes a contact with a rotating contact member 43 whose connection to the chuck surface 25 is clearly illustrated by Fig. 3. The member 43 and the chuck surface 25 are electrically connected by a long bolt 44 which is completely insulated from the gear 35 and the shaft 26, which rotate the assembly. A connection is provided between the wire 37 and the contact pin 24 through a resistor 45. Therefore, during the testing period, a rotating switch in the testing position 11 alternately completes and interrupts a circuit between the wires 36 and 37 through the resistors 41 and 45.

The electric measuring means provided measures substantially the total time during which electric current is changing in the resistors 41 and 45. The measuring means includes a pair of electron discharge devices 46 and 47, one of which interrupts a circuit for charging a condenser 48 through a resistor 49, when the current in the resistors 41 and 45 is at one extreme value, and the other of which interrupts the current through the charging circuit when the current in the resistors 41 and 45 is at another extreme value. The cathode of the device 46 is connected to the wire 37 and its anode is connected to one terminal of the condenser 48. The other terminal of a condenser is connected through an electromagnetic switch 50 to the cathode of the device 47, which is also connected through a resistor 51 to the wire 37. The anode of the device 47 is connected through the resistor 49 to the fixed element 40 of the supply switch.

To provide that the discharge devices 46 and 47 are made conductive and non-conductive at the desired times, the control electrode of the device 46 is connected through a resistor 52 and a source 53 of negative bias potential to the contact pin 24, and the control electrode of the device 47 is connected through a resistor 54 and a source 55 of negative bias potential to the spring member 42.

This measuring circuit produces a charge on the condenser 48 which is substantially proportional to the total amount of time required for current to change in the resistors 41 and 45. If it be assumed that the switch 27 in the testing position 11 is carrying current under steady stated conditions, the voltage drop through the resistor 45 is sufficient to maintain the control electrode of the device 46 positive so that it is conductive. However, the voltage drop through the resistor 41 with the addition of the bias supplied by the source 55 is sufficient to maintain the control electrode of the device 47 more negative than its cathode so that it is non-conductive. The two terminals of the condenser 48 are therefore connected respectively through the device 46 and the resistor 51 to the wire 37. If there is a charge present in the condenser 48, it is not short-circuited by this connection, since the terminal of the condenser 48 which is connected to the anode of the device 46 is at a negative potential, and the device 46 cannot conduct current in the direction required to discharge the condenser.

As the switch 27 is rotated by the chuck surface 25, the current therethrough is initially interrupted and begins to decrease. As the voltage across the resistor 41 decreases slightly, the control electrode of the device 47 becomes more positive and conduction through this device is initiated. A charge therefore begins to accumulate on the condenser 48 at a speed determined mainly by the size of the resistor 49. This resistor is sufficiently large so that the condenser 48 can only be partially charged during the entire length of time to be measured.

As the current through the switch 27 approaches its final extreme value, which in this case is zero, the control electrode of the device 46 becomes sufficiently negative with respect to its cathode, because of the source 53 of negative bias potential, so that the device 46 becomes non-conductive and isolates the condenser 48 from its charging voltage.

As the switch 27 is rotated still further, the circuit therethrough is again initially completed and, during the rise of current in the resistors 41 and 45, converse actions in the measuring means take place so that an additional charge is placed on the condenser 48, the magnitude of which depends on the amount of time required to complete the circuit.

After a predetermined number of rotations of the switch 37 have been completed, during which the condenser 48 has acquired a charge whose magnitude is determined by the arcing characteristics of the switch and hence by the quality of gas in the switch, the cam 38 comes into contact with the movable element 29 of the supply switch and moves it into contact with a fixed element 56 thereof. Operating potential is thereby supplied from the wire 36 to the operating coil 57 of the electromagnetic switch 50. The other terminal of the operating coil is connected through a current-limiting resistor 58 to the wire 37. Upon energization of the switch 50 the condenser 48 is disconnected from the device 47 and is connected in shunt to a resistor 59 and a source 60 of grid bias potential, connected serially. The positive terminal of the condenser 48 is also connected to the control electrode of an electron discharge device 61 whose cathode is connected to an adjustable tap 62 on a voltage dividing resistor 63. One end of the resistor 63 is connected to the negative terminal of the condenser 48, which is also connected to the wire 37, and the other end of the resistor is connected to the fixed element 56 of the supply switch, which is at the potential of the wire 36.

Upon connection of the condenser 48 in shunt to the resistor 59 and source 60, a surge of current results which raises the control electrode of the device 61 in potential. By adjustment of the tap 62 on the resistor 63 the potential of the cathode of the device 61 is adjusted so that it requires a predetermined rise in potential of the control electrode to render the device 61 conductive. In other words, the ultimate value of a quantity is compared to a standard quantity. In the illustrative form of my invention, the charge on the condenser 48 is compared to the grid bias on the device 61. Therefore, if the charge upon the condenser 48 is greater than a predetermined amount, the device 61 becomes conductive upon operation of the switch 50, and otherwise it remains non-conductive.

Since the quality of gas filling the switch 27, which has been tested, determines the amount of charge on the condenser 48, the device 61 becomes conductive or remains non-conductive respectively if the switch tested should be rejected or is acceptable. The anode of the device 61 is supplied with operating potential from the wire 36 through a resistor 64 and is connected through a condenser 65 to the control electrode of a vapor electric discharge device 66. The control electrode of the device 66 is by-passed to its cathode by a condenser 67 and is connected through a resistor 68 to a point between the resistor 59 and the source 60. When the device 61 becomes conductive its anode potential is decreased, and the control electrode of the device 66 accordingly becomes more negative. The charge, and hence the potential, across the condenser 65 during this time becomes small and when the device 61 again becomes non-conductive, the control electrode of the device 66 is raised in potential to a point nearly as far above its average potential as it was depressed in potential while the device 61 was conductive. The cathode of the device 66 is connected to the wire 37 so that, upon this rise in potential of its control electrode, the device 66 becomes conductive. The anode of the device 66 is supplied with positive potential through a resistor 69 and the operating coil 70 of a switch classifying apparatus 71 from the fixed member 56 of the supply switch.

The switch classifying apparatus 71 includes the operating coil 70 and a pivoted classifying member 72 which is arranged to be moved upon energization of the coil 70. The classifying member 72 is pivoted upon a portion 73 of the base 20 and is biased toward the left by a spring 74.

The operation of the classifying apparatus 71 may be better understood by reference to Fig. 2. In this figure the switch 27 is shown just after it has dropped from the testing position 11, due to removal of the retaining pin 26 from a position beneath the switch. The tested switch 27 is shown in mid air and just touching the classifying member 72. In the position in which the member 72 is shown, the spring 74 retains it in the left-hand position, since the coil 70 has not been energized. This indicates that the charge on the condenser 48 was less than the predetermined amount found to define a desired quality of gas in the switch 27. Since in the position shown the switch 27 has considerable kinetic energy it rebounds from the member 72 and drops toward the right, as indicated by the doted lines 27'. A compartment 75 is provided into which acceptable switches may fall, just above which the switch at position 27' is shown. If the quality of the gas in the switch 27 had been unsatisfactory, the charge on the condenser 48 would have been greater than an amount predetermined by the setting of the adjustable tap 62 and, through the devices 61 and 66, the coil 70 would have been energized. Energization of the coil 70 would have moved the classifying member 72 to the right-hand position in Fig. 2 so that the switch 27 in falling and rebounding therefrom would have been impelled to the left into the compartment 76 provided for rejected switches.

The action of this mechanism is simple and reliable in making automatic measurements of the total time duration of arcs in gas filled switches and in accepting or rejecting them after automatic comparison of the measurement with the standard. It has been found with the particular type of hydrogen-filled switch illustrated that a pressure difference as small as 5 pounds per square inch in the hydrogen atmosphere in the switch may readily be detected. The mechanism described is highly accurate and capable of operation at high speed, so that switches may be tested rapidly in large numbers.

Referring to Fig. 6, a circuit is illustrated which differs from the circuit illustrated in Fig. 1 only in the means provided for measuring the time duration of arcs. A single electron discharge device 77 is employed to control the charging of the condenser 48 instead of the two devices 46 and 47 which, with the condenser 48, form the time measuring means in the circuit of Fig. 1. Many parts in the circuit of Fig. 6 are identical with those illustrated by Fig. 1 and are, therefore, given like reference characters.

The movable element 39 of the supply switch, when deflected to its lower position, supplies current from the wire 36 through the fixed element 40 to the switch 27 under test. The circuit from the other terminal of the switch 27 passes through a wire 79 and through a resistor 80 to the negative wire 37. The cathode of the device 77 is connected to an adjustable tap 81 on the resistor 80 and its anode is connected by the switch 50, in its deenergized position, serially through the condenser 48 and through a resistor 82 to the wire 79. The control electrode of the device 77 is supplied with a fixed potential through a grid resistor 83 from an adjustable tap 84 of a voltage dividing resistor 85 which is connected between the wires 36 and 37.

When the switch under test is carrying no current, no potential exists across the resistor 80 so that the condenser 48 cannot be charged. As the switch under test begins to carry current, the potential across the resistor 80 rises and the device 77 remains conductive until its cathode approaches the fixed potential of its control electrode. While the device 77 remains conductive, the condenser 48 acquires a charge through the resistor 82. The adjustable tap 84 may be set so that the device 77 becomes non-conductive just before the current through the resistor 80 reaches its stable extreme value. As with the circuit of Fig. 1, converse actions take place on interruption of the current through resistor 80 by the switch. This arrangement of circuit elements thus provides a measuring circuit which reaches the same result as the measuring circuit illustrated by Fig. 1. It has been found desirable to shunt the resistor 85 with a condenser 86 for the purpose of minimizing the effect on the measuring circuit of changing voltage conditions between the wires 36 and 37.

The operation of the remainder of this circuit, that is, relay tubes 61 and 66 and the classifying apparatus, is identical with that described in connection with Fig. 1. When the movable member 39 of the supply switch deenergizes the switch 27 and supplies current through the fixed element 56 to energize the coil 57 of the switch 50, the devices 61 and 66 become conductive or remain non-conductive in accordance with the amount of charge which has accumulated on the condenser 48. The switch 27, which has determined the amount of charge on the condenser 48 in accordance with the quality of its gas content, is accordingly accepted or rejected by classifying apparatus such as illustrated by Fig. 1, operated by the coil 70.

The curves 87 and 88 in Fig. 3 represent the voltage variation with respect to time across a particular hydrogen-filled mercury switch during two successive cycles of operation in which the circuit is first interrupted and then completed. It is clear from these curves that voltage rises and falls across the contacts of a gas-filled switch in a very erratic manner. However, the amount of time necessary for the arc to be extinguished upon completion or interruption of the circuit is fairly constant, so that if the average time of arc duration during a number of operations be taken, an excellent measure of merit is obtained for the gas filling the switch. It has been found that very accurate results are obtained if each switch tested be operated six or seven times.

The circuits and the apparatus described herein are especially useful for testing the quality of gas-filled enclosed mercury switches, but it should be understood, of course, that the circuits may be used and the apparatus easily adapted for testing the gas filling of any type of switch.

While I have shown a particular embodiment of my invention, it will, of course, be understood that I do not wish to be limited thereto since different modifications may be made both in the circuit arrangement and instrumentalities employed, and I aim by the appended claims to cover any such modifications as fall within the true spirit and scope of my invention.

What I claim as new and desire to secure by Letters Patent of the United States is:

1. The combination in apparatus for testing switches of a type operable by rotation and having terminals on opposite sides thereof, of a testing station adapted to receive one of said switches, means at said testing station for producing a transient electric arc in said switch comprising a source of electric current, a chuck having a pair of opposed electrically conducting faces connected in circuit with said source and respectively adapted to engage said terminals and to hold said switch therebetween, means to deliver periodically a single switch between said faces, means to synchronize engagement of said faces and switch terminals with operation of said delivering means, means for rotating said chuck to complete and interrupt the circuit through said switch including said source, and means in said circuit responsive to a characteristic of said arc for automatically classifying said switch in accordance with the arc characteristic.

2. The combination in apparatus for testing switches, of a testing station adapted to receive one of said switches, means at said testing station for repeatedly operating said switch to open and closed position to produce a succession of transient arcs in said switch, said means comprising an electric circuit including means for developing an electric quantity at a predetermined rate during and throughout the existence of said arcs, said developing means being operative to begin and end development of said electric quantity respectively upon the initiation and extinction of each of said arcs, means responsive to the ultimate value of said quantity for electrically comparing said quantity with a similar standard quantity, and means for classifying said switch in accordance with the comparative values of said quantities.

3. The combination in apparatus for testing switches of a type operable by rotation and having terminals on opposite sides thereof, of a testing station adapted to receive one of said switches, means at said testing station for repeatedly operating said switch to open and closed position to produce a succession of transient arcs in said switch, said last means comprising a rotatable chuck having a pair of opposed electrical conducting faces respectively adapted to engage said switch terminals and to hold said switch therebetween, an agency operative in a predetermined fashion during and throughout the existence of each of said arcs, means for automatically beginning and ending the operation of said agency respectively upon the initiation and extinction of said arcs, and means responsive to the total time of operation of said agency for comparing a time-dependent characteristic of said arcs with a standard.

4. In apparatus for testing gas-filled switches, the combination which includes a testing station means to deliver switches individually and periodically to said testing station, means at said testing station for repeatedly operating each switch to open and closed position to produce a succession of transient arcs in said switch, electric charge storing means for storing an electric charge during the existence of each of said arcs, the amount of charge storage being a function of the quality of the gas content of the switch, means for preventing the release of stored charges during intervals between successive arcs, and means responsive to the total charge accumulated by said charge-storing means during the complete succession of arcs for automatically classifying said switch in accordance with the quality of its gas content.

5. Apparatus for testing electrical devices of a type having terminals on opposite sides thereof and operable by rotation about an axis which includes the said terminals, said apparatus including a testing station, a rotatable chuck at the testing station having opposed electrically conductive parts adapted to engage the terminals of said devices, means for producing intermittent approaching and regressive movement between said chuck parts, means for conveying devices at fixed intervals to the testing station and for causing conveyed devices to pass between the opposed parts of said chuck, means for synchronizing the approaching movement of the chuck parts with the interposition of individual devices between them, thereby to effect engagement of the chuck parts with the terminals of the interposed devices, means to rotate said chuck to produce concurrent rotation of the engaged device, and circuit means connected with said conductive chuck parts and responding to the operation of the engaged device during rotation thereof for determining the course of the device upon the occurrence of the next regressive movement of the chuck parts.

6. Apparatus for testing electrical devices of a type having terminals on opposite sides thereof and operable by rotation about an axis which includes the said terminals, said apparatus including a testing station, a rotatable chuck at the testing station having opposed electrically conductive parts adapted to engage the terminals of said devices, conveying means for moving individual devices to said testing station at fixed intervals, means to cause said conveyed devices to pass between the opposed parts of said chuck, means for causing an approaching movement between said chuck parts upon the interposition of an individual device between them, thereby to effect engagement of the chuck parts with the terminals of the interposed device, means for rotating said chuck to rotate the engaged device concurrently, means to cause regressive movement between said chuck parts subsequent to rotation of the engaged device, and circuit means connected with said conductive chuck parts and responding to the operation of the engaged device during rotation thereof for determining the course of said device upon the occurrence of the regressive movement of the chuck parts.

7. Apparatus for testing electrical devices of a type having terminals on opposite sides thereof and operable by rotation about an axis which includes the said terminals, said apparatus including a testing station, a rotatable chuck at the testing station having opposed electrically conductive parts adapted to engage the terminals of said devices, means for producing intermittent approaching and regressive movement between said chuck parts, a moving conveyor having a pocket adapted to receive one of said devices at said loading station and to discharge it at said testing station, means at the testing station for receiving a device discharged from the said pocket and for supporting it between the chuck parts pending an approaching movement of said parts, means for synchronizing the approaching movements of the said chuck parts with the interposition of individual devices between them, thereby to assure engagement by such parts of the terminals of each device supported between the parts by said device receiving means, means to rotate said chuck to produce concurrent rotation of the engaged device, and circuit means connected with said chuck parts responsive to the operation of the engaged device during rotation thereof for determining the course of the device upon the occurrence of the next regressive movement between the chuck parts.

8. Apparatus for testing electrical devices of a type having terminals on opposite sides thereof and operable by rotation about an axis which includes the said terminals, said apparatus including a testing station, a pair of opposed conducting members at the testing station adapted to engage respective terminals of said devices, means for producing intermittent approaching and regressive movement between said members, means for conveying devices at fixed intervals to the testing station and for causing conveyed devices to pass between said opposed members, means for synchronizing the approaching movement of said members with the interposition of individual devices therebetween, thereby to effect engagement of said members with the respective terminals of the interposed device, means to rotate at least one of said members to produce concurrent rotation of the engaged device, and circuit means connected with said conductive members and responding to the operation of the engaged device during rotation thereof for determining the course of the device upon the occurrence of the next regressive movement of said member.

9. Apparatus for testing electrical devices of a type having terminals on opposite sides thereof and operable by rotation about an axis which includes the said terminals, said apparatus including a testing station, a pair of opposed conductive members at the testing station adapted to engage respective terminals of said devices, means for producing intermittent approaching and regressive movement between said opposed members, a vertical wheel having a pocket in the periphery thereof adapted to receive a single device, said wheel being rotated at constant speed to move said pocket to a low position adjacent said testing station, means to maintain said device in said pocket until it reaches said low position when said device drops into said testing station, means to support said device between said opposed members, until engagement is effected therebetween, means for synchronizing the approaching movement of said members with the interposition by said wheel of an individual device between said members, thereby to effect engagement of said members with the respective terminals of the interposed device, means to rotate at least one of said members to effect concurrent rotation of the engaged device, and circuit means connected with said conductive members and responding to the operation of the engaged device during rotation thereof for determining the course of the device upon the occurrence of the next regressive movement of said member.

10. In apparatus for testing switches, the combination which includes a testing station, means to deliver switches individually and periodically to said testing station, means at said testing station for repeatedly operating each switch to open and closed positions to produce a succession of transient arcs in said switch, electric charge storing means for storing an electric charge during the existence of each of said arcs and retaining said charge thereafter, the amount of charge storage being a function of the quality of the gaseous content of the switch, and means responsive to the total charge accumulated by said charge storing means during the complete succession of arcs for automatically classifying said switch in accordance with the quality of its gaseous content.

11. In apparatus for testing switches, the combination which includes a testing station, means to deliver switches individually and periodically to said testing station, means at said testing station for repeatedly operating each switch to open and closed position to produce a succession of transient arcs in said switch, means for storing electric energy at a predetermined rate during and throughout the existence of each of said arcs, the total energy storage being a function of the quality of the gaseous content of the switch, and means responsive to such total energy storage during the complete succession of arcs for automatically classifying said switch in accordance with the quality of its gaseous content.

JOHN H. PAYNE.